A. W. McKNOWN.
SPRING FOR WAGON.
No. 109,033.  Patented Nov. 8, 1870.
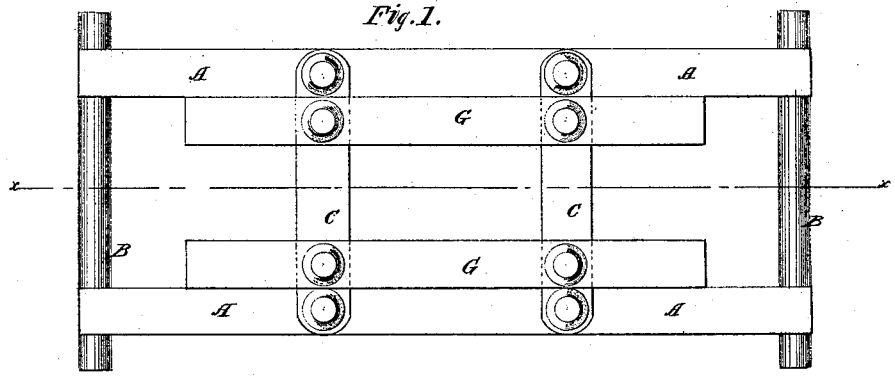
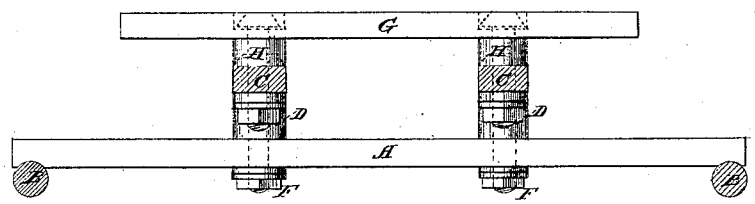
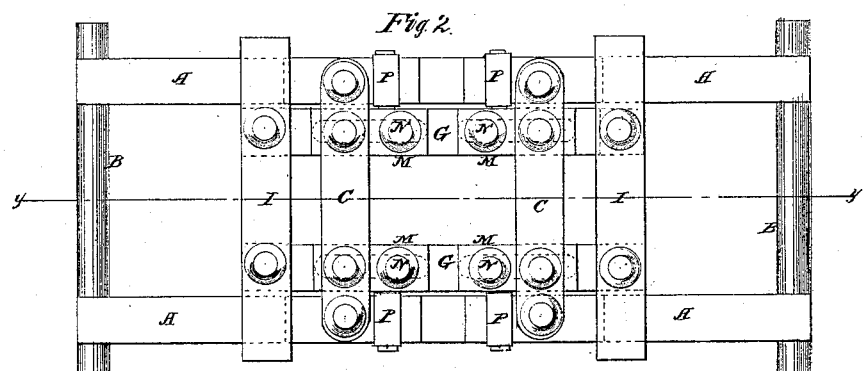
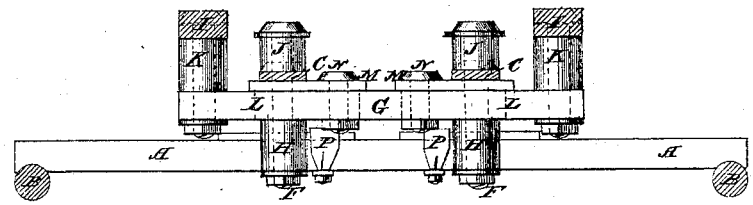
Witnesses:
Inventor:

United States Patent Office.

ALEXANDER W. McKOWN, OF HONESDALE, PENNSYLVANIA.

Letters Patent No. 109,033, dated November 8, 1870.

IMPROVEMENT IN SPRINGS FOR WAGONS.

The Schedule referred to in these Letters Patent and making part of the same.

*To all whom it may concern:*

Be it known that I, ALEXANDER W. McKOWN, of Honesdale, in the county of Wayne and State of Pennsylvania, have invented a new and useful Improvement in Springs; and I do hereby declare that the following is a full, clear, and exact description thereof, which will enable others skilled in the art to make and use the same, reference being had to the accompanying drawing forming part of this specification.

This invention relates to improvements in springs for wagons, mainly, but applicable for other uses; and It consists in a combination of cylindrical India-rubber springs, wood springs, and bars, calculated to form very efficient springs, which may be cheaply made, all as hereinafter described.

Figures 1 and 2 represent, in plan views, two different arrangements of springs, made according to my invention, and Figures 3 and 4 are sectional elevations of the same.

Similar letters of reference indicate corresponding parts.

A represents two long wood bars or springs, which may be stretched between the axles B of a wagon, or one axle and a bolster, or between any other supports, on which I rest the transverse pieces C at the ends, with the cylindrical rubber springs D between them, said springs and the pieces C being held in place by bolts E passing down through the bars A, and having nuts F at the said ends to confine them, which nuts are screwed up tightly against the under sides of the said pieces A.

These transverse pieces C may in like manner support other longitudinal bars, G, mounted on springs H, either above the bars C, as in figs. 1 and 3, or below, as in figs. 2 and 4, and similarly bolted to them, but in the latter case suspended by the bolts F; and the bolts may have springs J between the heads and the upper sides of bars C.

Longitudinal bars G, when arranged as in figs. 1 and 3, may receive and support the wagon-box, or, when arranged as in figs. 2 and 4, they may have other transverse bars I, mounted near their ends on rubber springs K, placed between them and secured by bolts as the others are, and in this case the wagon-box may be placed on these cross-bars instead of the longitudinal bars G, fig. 1.

Other arrangements of bars and springs may be made to multiply the springs, as may be preferred, or other arrangements of the same numbers of bars and springs may be used. If more springs and bars are used, the elastic and flexible capacities are correspondingly increased.

I propose, for the purpose of adjusting these springs, to vary their capacity, to arrange the bolts in the longitudinal bars, so that they may be moved to or from each other, the holes through the said bars being elongated for the purpose, as indicated by the dotted lines L in fig. 4; and, for holding them against slipping along the bars, which they might do, owing to the loosening of the bolts F when the springs are compressed, I employ the clamping and adjusting pieces M, to hold the said bolts, which pass through them in holes fitting them snugly, and the said pieces are firmly clamped to the bars A or G by bolts N or clips P.

The springs are made more rigid by moving the bolts and rubber springs from each other, and more yielding by moving them toward each other.

Separate springs for each end of the wagon-box, one to be attached to each bolster, may be made in this way, the bars A being duly shortened, and either arranged in the longitudinal or transverse direction of the wagon, or these bars being altogether dispensed with, the bars G, figs. 2 and 4, may take their place, and they may be arranged transversely of the wagon, the pieces C being rested at the center across the bolster.

In making these springs, care is taken not to make the India-rubber springs too high in proportion to their transverse measurement, as they are subject to lateral movement as well as vertical, which must not be too much, and may be regulated in this way.

These springs have in this lateral movement very much of the character of thorough brace springs, but with the advantage of being much more accurately regulated or adjusted.

To facilitate the lateral rocking of the India-rubber springs on their seats the holes in the wood bars for the bolts may be made to increase in size from the center of the bars each way.

The bars A need not necessarily in all cases be capable of springing, for, where a sufficient number of India-rubber springs are used, they may be rigid.

It will be seen that my improved springs are distinguished in the arrangement of the parts made of India rubber from such springs as now used in railroad cars and other like places, in not confining them between exterior guides, which I do to avail myself of their capacity for lateral movement, which is very essential for wagon-springs, owing to the uneven roads, which cause severe side thrusts.

Having thus described my invention,

I claim as new and desire to secure by Letters Patent—

1. The improved wagon or other springs, formed by a combination of the wood bars or springs A, one or more sets of transverse bars C, one or more sets of longitudinal bars G, and the India-rubber springs, all substantially as specified.

2. The combination with the longitudinal bars and the India-rubber springs, of the adjusting pieces M, substantially as specified.

3. The combination of the wood bars, India-rubber springs, and bolts, all substantially as specified.

The above specification of my invention signed by me this 27th day of September, 1870.

ALEXANDER W. McKOWN.

Witnesses:
GEO. W. MABEE,
T. B. MOSHER.